United States Patent
Lam

(10) Patent No.: US 6,721,506 B1
(45) Date of Patent: Apr. 13, 2004

(54) METHOD AND SYSTEM FOR DELIVERING MULTI-BAND BROADCAST SERVICES IN WAVELENGTH DIVISION MULTIPLEXED PASSIVE OPTICAL NETWORKS

(75) Inventor: Cederic Fung Lam, Monmouth, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/471,391

(22) Filed: Dec. 23, 1999

(51) Int. Cl.[7] ............................................. H04J 14/00
(52) U.S. Cl. ........................... 398/70; 398/66; 398/67; 398/68; 398/71; 398/72; 398/79; 398/84; 398/85; 398/98; 398/100; 398/182; 398/183; 398/200; 385/24; 385/37
(58) Field of Search ............................. 398/66, 68, 87, 398/71, 82, 67, 79, 70, 84, 85, 98, 100, 182, 183, 200; 385/24, 37

(56) References Cited

U.S. PATENT DOCUMENTS

| | | | |
|---|---|---|---|
| 5,742,414 A | | 4/1998 | Frigo et al. |
| 5,812,712 A | * | 9/1998 | Pan .............................. 382/37 |
| 6,041,152 A | * | 3/2000 | Clark ........................... 385/24 |
| 6,137,442 A | * | 10/2000 | Roman et al. ............... 342/375 |
| 6,137,611 A | * | 10/2000 | Boivin et al. ................ 359/168 |
| 6,195,200 B1 | * | 2/2001 | DeMarco et al. ............ 359/341 |
| 6,212,306 B1 | * | 4/2001 | Cooper et al. ................. 385/12 |
| 6,275,511 B1 | * | 8/2001 | Pan et al. ........................ 372/6 |
| 6,282,005 B1 | * | 8/2001 | Thompson et al. .......... 359/173 |
| 6,292,603 B1 | * | 9/2001 | Mizuochi et al. .............. 385/24 |
| 6,295,149 B1 | * | 9/2001 | Meli ............................ 359/130 |
| 6,295,395 B1 | * | 9/2001 | Paek ............................. 385/24 |
| 6,390,633 B2 | * | 5/2002 | Shirasaki et al. ............ 359/868 |
| 6,430,336 B1 | * | 8/2002 | Frankel ......................... 385/24 |

OTHER PUBLICATIONS

F.R. Iannone, K.C. Reichmann and N.J. Frigo, "High–Speed Point–to–Point and Multiple Broadcast Services Delivered over a WDM Passive Optical Network", IEEE Photonics Technology Letters, vol. 10, No. 9, pp. 1328–1330, Sep. 1998.

X. Lu, T. E. Darcie, G.E. Bodeep, S.L. Woodward and A.H. Gnauck, "Mini–fiber–node hybrid fiber coax networks for two–way broadband access", OFC '96 Optical Fiber Communication, vol. 2, 1996, Technical Digest, pp. 143–144.

X. Lu, T. E. Darci, A. Gnauck, S. Woodward, B. Desai and X. Qui, "Crafting a Low–Cost Two–Way Upgrade: Future–Proofing via Aggressive Fiber Deployment", Communication Engineering & Design, Mar. 1998, pp. 52–61.

Sniezko, T. Werner, D. Combs, E. Sandino, X. Lu, T. Darcie, A. Gnauck, and R. Mclaughlin, "HFC Architecture in the Making: Future–Proofing the Network", Communication Engineering & Design, Jul. 1999.

Garrett, L.D., Gnauck, A.H., Forghieri, F., Gusmeroli, V. and Scarano, D., "16×10 Gb/s WDM transmission over 840–km SMF using eleven broad–band chirped fiber gratings", IEEE Photonics Technology Letters, vol.: 11 4, Apr., 1999, pp. 484–486.

* cited by examiner

Primary Examiner—Leslie Pascal
Assistant Examiner—Hanh Phan

(57) ABSTRACT

A method and system deliver multiple-band broadcast services in a network such as a wavelength division multiplexed passive optical network. In the transmitter and/or receiver of such a system, filters are cascaded to stack data corresponding to different services within different free spectral frequency ranges of an optical transmission signal. Each filter is used to select a portion of a free spectral frequency range to be delivered to a user node. Each transmitter filter confines the output from spontaneous emission sources to a desired spectral region. The cascaded filters can also combine multiple spectra and/or separate combined broadcast spectrum. The method can also be used to partition the output from a broadband spectral source into different portions in the spectral domain.

1 Claim, 10 Drawing Sheets

METHOD AND SYSTEM FOR DELIVERING MULTI-BAND BROADCAST SERVICES IN WAVELENGTH DIVISION MULTIPLEXED PASSIVE OPTICAL NETWORKS

BACKGROUND OF THE INVENTION

1. Field of Invention

This invention relates to data transmission over wavelength division multiplexed passive optical networks. More specifically, the invention relates to providing a bandwidth efficient way of delivering multiple broadcast services on such a network using broadband spontaneous emission optical sources.

2. Description of Related Art

Wavelength division multiplexed passive optical networks (WDM PON) can be used to deliver both switched and broadcast services on the same fiber plant. P. P. Iannone, K. C. Reichmann and N. J. Frigo, "High-Speed Point-to-Point and Multiple Broadcast Services Delivered over a WDM Passive Optical Network", IEEE Photonics Technology Letters, Vol. 10, No. 9, pp. 1328–1330, September 1998. As shown in FIG. 1, to deliver broadcast services, a conventional WDM PON system 100 includes at least one broadband optical source 110, at least one WDM remote node 120 and a plurality of user nodes 130–150. The broadband optical source 110 is coupled to the input port of the WDM remote node 120. The broadband optical source 110 is modulated to incorporate the service data to be broadcast to the user nodes 130–150. The plurality of user nodes 130–150 are coupled to the various outputs of the WDM remote node 120.

The WDM remote node 120 consists of a wavelength router for distributing data to different user nodes. A wavelength router is also called an arrayed waveguide router (AWG) or waveguide grating router (WGR). The wavelength router has a cyclical property. For example, given a four-output port wavelength router, if the sum of equally separated input wavelengths $\lambda_1, \lambda_2, \lambda_3, \lambda_4$ are coupled to its input port, then $\lambda_1$ will appear at output port 1, $\lambda_2$ at output port 2 etc., in similar ways as any other wavelength demultiplexers. However, if wavelengths $\lambda_5, \lambda_6, \lambda_7, \lambda_8$ are coupled to the input port, then $\lambda_5$ will again appear at output port 1, $\lambda_6$ at output port 2 etc. In other words, the wavelength demultiplexing property repeats over ranges of wavelengths or frequencies. The smallest range of wavelength over which the cyclical property repeats is called the free spectral range (FSR) of the wavelength router. In broadcast operation, the output spectrum of the broadband optical source 110, modulated with the broadcast data, contains wavelength components covering at least one FSR of the wavelength router. The wavelength router slices the frequency spectrum of the optical signal produced by the optical source 110 to deliver the broadcast service to the user nodes 130–150. Each user node 130–150 gets part of the broadcast signal, albeit at different wavelengths. For example, as shown in FIG. 1, one FSR of the wavelength router is shown. However, each node normally sees multiple FSR's and the spectrum of the optical source 110 usually covers more than one FSR. User node 130 receives a bottom slice of the FSR, user node 140 receives a middle slice of the FSR and user node 150 receives a top slice of the FSR. In actuality, the cyclical property of the wavelength router comes from the fact that it is implemented as an interferrometric device.

Multiple broadcast services have also been realized using different FSRs of the wavelength router. FIG. 2 illustrates a different conventional system architecture for providing multi-band broadcast services in a WDM PON. Specifically, as shown in FIG. 2, the system 200 includes a first optical source 205 and a second optical source 210, a combiner 215, a WDM remote node 220 and a plurality of user nodes 230–250. The output from the first and second optical sources 205, 210 are coupled to the combiner 215, which is also coupled to the input of the WDM remote node 220. The plurality of user nodes 230–250 are also coupled to the various outputs of the WDM remote node 220. The WDM remote node 220 also incorporates a wavelength router, which has the wavelength or frequency cyclic property, for distributing different broadcast data streams within specific portions of the frequency spectrum to various user nodes. As shown in FIG. 2, the illustrations of user nodes 230–250 each include a graph depicting the slices of the transmitted spectrum received by each user node.

The first optical source 205 generates the optical signal associated with a first frequency band, B1, which encompasses a specific FSR of the router within the WDM node 220. This optical signal is modulated by the data of the first broadcast service. The second optical source 210 generates the optical signal associated with a second frequency band, B2, which encompasses the next FSR of the router within the WDM node 220. This optical signal is modulated by the data of the second broadcast service. Therefore, as shown in FIG. 2, user node 230 receives low end slices of both the first and second frequency bands B1 and B2. Similarly, user node 240 receives intermediate slices of both the first and second frequency bands B1 and B2. User node 250 receives high end slices of the first and second frequency bands. Although FIG. 2 depicts only two FSR's B1 and B2, it should be appreciated that any number of free spectral ranges may be used to transmit different data streams and to support either broadcast or switched services. Switched services will not be described in this document. Although FIG. 2 illustrates only three user nodes 230, 240, 250, it should also be appreciated that the number of user nodes is only limited by the number of output ports of the wavelength router in the remote node 220.

In such broadcast applications, the optical sources 110, 205 and 210 are broadband sources. Examples of broadband sources include multi-wavelength laser diodes and spontaneous emission sources such as light emitting diodes (LED's) or Erbium doped fiber amplifiers (EDFA's) operated in spontaneous emission mode. The optical sources 110, 205 and 210 are located in a hub station or a central office of the service provider, which is also called a Host Digital Terminal (HDT) sometimes, and the transmitted signals are connected to the input port of the remote nodes 120 and 220 through a section of feeder optical fiber.

SUMMARY OF THE INVENTION

However, there is a need for producing a system for delivering multiple broadcast services in a spectral efficient way and a scalable way so that the network services can grow easily. Therefore, the invention provides a method and system for delivering multiple broadcast services in a bandwidth efficient and easily growable way in a WDM PON using broadband spontaneous emission optical sources.

The invention relates to using a chirped fiber Bragg grating (FBG) coupled to an optical circulator in a transmitter and/or a receiver used in a WDM PON to select one or more FSR's to be delivered to user nodes. Such an arrangement can be cascaded to combine or separate different sections of the frequency spectrum. In accordance with the exemplary embodiments of the invention, a WDM PON may include multiple transmitters at the hub or central office and multiple receivers located at different user nodes within the PON.

In accordance with the exemplary embodiments of the invention, a filter comprised of an optical circulator and a chirped FBG confines the output from a spontaneous emission source to a desired spectral region. The hub station or central office utilizes such cascaded filters to combine multiple non-overlapping optical spectra from transmitters of different broadband services to be delivered through the feeder optical fiber. At a user node, a band splitter utilizing such cascaded filters separates the combined broadcast spectrum into individual service bands received by separate receivers.

The invention may be implemented to separate the spectral output of a spontaneous emission source such as an EDFA or a praseodymium-doped fiber amplifier (PDFA) into different bands for supporting different broadcast services, allowing sharing the cost of a single optical source.

The invention is also useful in situations in which a relaxed tolerance is required for the source wavelengths, e.g. using an uncooled laser in a WDM system without spectral slicing, provided the wavelengths are separated far enough from each other. Specifically, the broadband chirped FBG/optical circulator wavelength add/drop technique is useful in coarse WDM systems which allow for more tolerance to wavelength shifting.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

In accordance with the exemplary embodiments of the invention, spontaneous emission sources are used at transmitters for delivering broadcast services in a WDM PON system. By covering a full FSR of the wavelength router used in a WDM remote node, every user node obtains a slice of a transmitted spectrum albeit at different wavelengths, thereby achieving broadcast service delivery.

To achieve efficient spectral usage, an ideal broadband source for broadcast purposes should cover exactly one FSR. Such coverage ensures that every user node receives a slice of the broadcast signal while at the same time, enables different broadcast services to be closely stacked in the optical spectral domain. Spontaneous emission sources such as LEDs usually have output spectra that are much wider, e.g., 5 to 10 times wider than the FSR of a typical wavelength router. Therefore, a filter is implemented in front of the broadband source to confine its output spectrum to one FSR and to enable efficient wavelength stacking.

Figure 1:
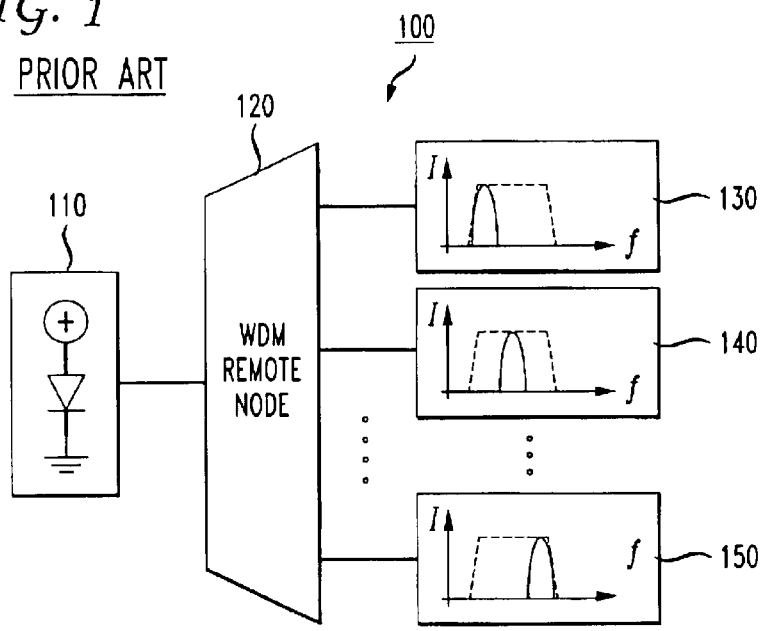
FIG. 1 illustrates a diagram of a conventional WDM PON system architecture providing broadcast services using spectral slicing.
Figure 2:
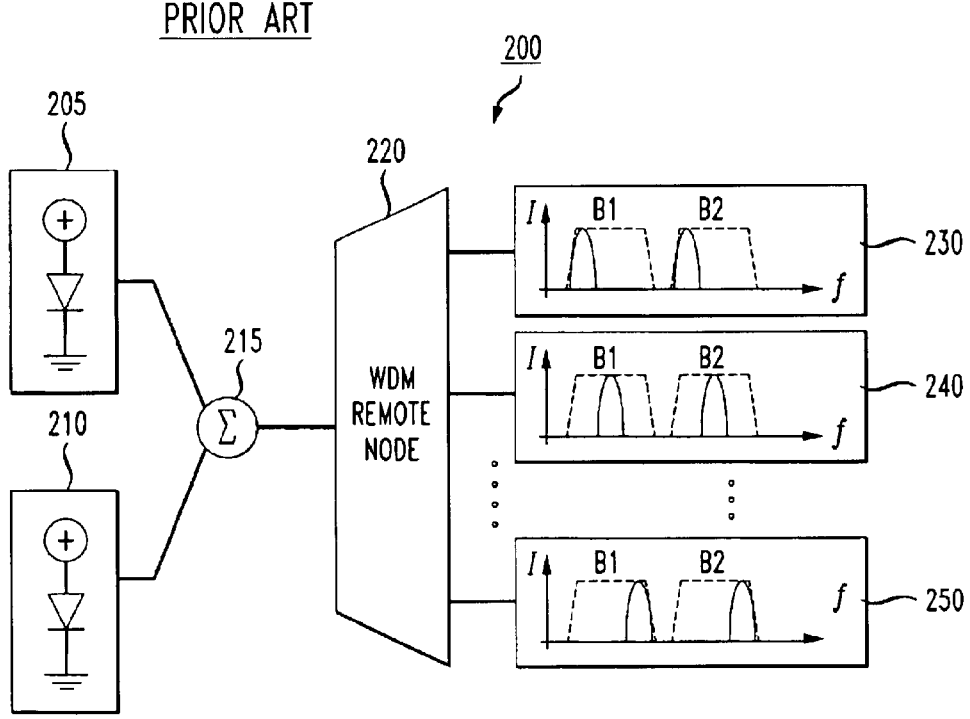
FIG. 2 illustrates a simplified diagram of a conventional WDM PON system architecture providing multiple-broadcast services using stacking.
Figure 3:
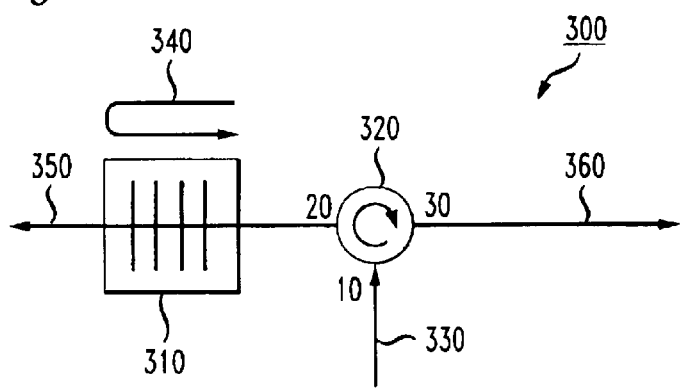
FIG. 3 illustrates a diagram of a component combination including a chirped fiber Bragg grating and an optical circulator utilized by the exemplary embodiments of the invention.
Figure 4:
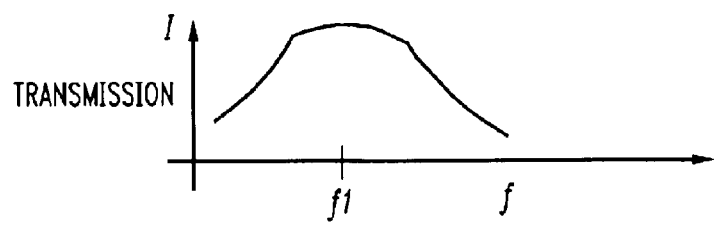
FIG. 4 illustrates the input optical signal produced by a spontaneous emission source and coupled to the first port of the optical circulator illustrated in FIG. 3.
Figure 5:
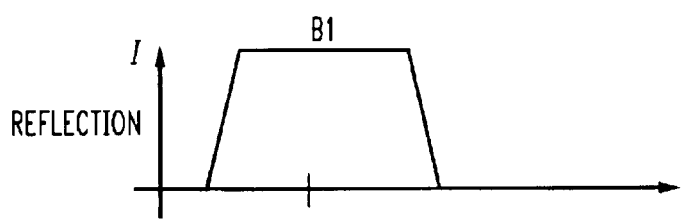
FIG. 5 illustrates the reflectivity of the FBG illustrated in FIG. 3.

Such filtering is preferably performed using component arrangement including an FBG and an optical circulator. As shown in FIG. 3, such an arrangement includes an FBG 310 connected to an optical circulator 320. Optical signals 330 produced by a spontaneous emission source, not shown, enter the optical circulator 320 through a first port 10. FIG. 4 illustrates the optical signal frequency spectrum of the signal entering the first port 10. As shown in FIG. 3, once in the optical circulator 320, the optical signal 330 is then routed by the optical circulator 320 to output from the second port 20. The FBG 310 then reflects a first portion 340 of the optical signal back into the second port 20 of the optical circulator 320 and allows a second portion 350 to pass through the FBG 310. The first portion 340 covers the optical spectrum corresponding to a selected FSR. The FBG 310 is preferably a chirped FBG 310 with a rectangular shaped reflective spectral response characterized by a flat-top high reflectivity in the desired spectral range and fast roll-off outside the desired spectral range, as shown in FIG. 5.

Figure 6:
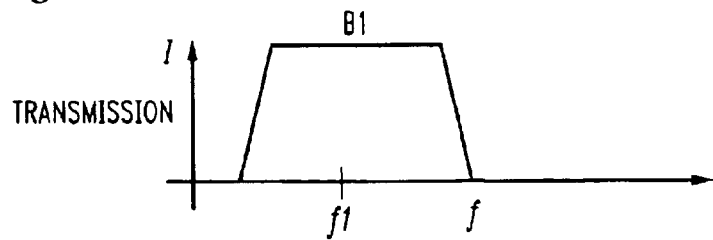
FIG. 6 illustrates the optical signal delivered from the third port of the optical circulator illustrated in FIG. 3.

The selected portion 340 of the optical signal is reflected by the FBG 310 back into the second port 20 of the optical circulator 320. Subsequently, the selected portion 340 is output from the optical circulator 320 via the third port 30 as optical signal 360. FIG. 6 illustrates the selected optical signal spectrum by 310 as an optical signal band B1. The FBG 310 reflectivity defines the spectrum of the optical circulator output 360, shown in FIG. 6.

Accordingly, only the part of the frequency spectrum entering the grating-circulator filter and covering the desired optical spectrum is transmitted through the optical circulator and emerges from the third port 30. By making use of the excellent wavelength selectivity of FBGs, the optical output frequency spectrum B1 can be well defined.

Figure 7:
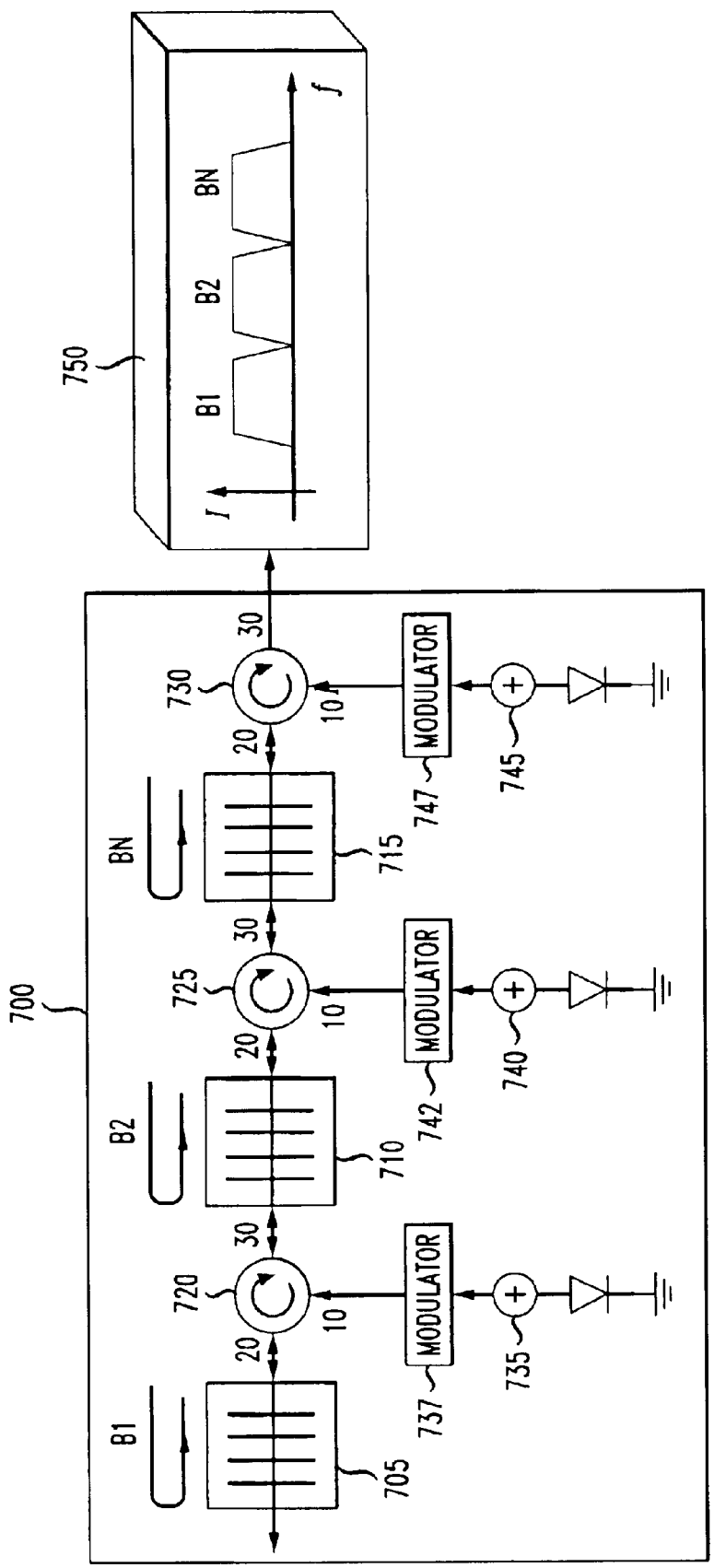
FIG. 7 illustrates a diagram of a hub node or a central station that provides multiple-broadcast services utilizing cascaded FBG-circulator arrangements as illustrated in FIG. 3, in accordance with a first exemplary embodiment of the invention.

By cascading the grating-circulator arrangement with different spectral responses, multiple services can be "added" together in a power efficient way because the FBGs can be fabricated with almost perfect reflectivity (e.g., 99% or better in the reflective spectrum range), and optical circulators have very low losses, e.g., less than 1 dB insertion loss. FIG. 7 illustrates a diagram of a multiple broadcast service transmitter section 700 at a central office that utilizes cascaded FBG's in accordance with a first exemplary embodiment of the invention. As shown in FIG. 7, a multiple service transmitter 700 includes FBGs 705, 710, 715, optical circulators 720, 725, 730 modulators 737, 742,747 and spontaneous emission sources 735, 740, 745.

The spontaneous emission source 735 is modulated by the modulator 737 to incorporate data for a first service (Service 1) to be delivered to user nodes (not shown). Delivery to the user nodes is performed via a waveguide router remote node (not shown) coupled to the third port 30 of the optical circulator 730. FBG 705 and optical circulator 720 act as an optical filter for the spontaneous emission source 735. FBG 710 and optical circulator 725 act as an optical filter for the spontaneous emission source 740. FBG 715 and optical circulator 730 act as an optical filter for the spontaneous emission source 745.

An optical signal produced by the spontaneous emission source 735 is modulated by the modulator 737 and enters the optical circulator 720 through a first port 10. Once coming into the optical circulator 720 through port 10, the optical signals are then outputted from the optical circulator 720 through the second port 20. It will then visit the FBG 705. The FBG 705 reflects a first portion of the optical signals generated by the optical source 745, corresponding to the selected FSR B1, and allows a second portion to pass through the FBG 705. It should be noted that for convenience, we assume the optical spectrum B1 to cover one FSR of the wavelength router. In actuality, B1 does not have to be exactly one FSR. As long as B1 is bigger than one FSR, each user will get at least one slice of the optical spectrum carrying the broadcast signal imposed by the optical modulator 737. This principle also applies to the other broadcast signals B2 and BN described below. The selected FSR B1 is reflected by the FBG 705 back into the optical circulator 720 via the second port 20. Subsequently, the FSR B1 is output from the optical circulator 720 via the third port 30.

An optical signal produced by the spontaneous emission source 740 is modulated by the modulator 742 to incorporate the data for a second service (Service 2) and enters the optical circulator 725 through a first port 10. Once coming into the optical circulator 725 through port 10, the optical signals are then outputted from the optical circulator 725 through the second port 20. It will then visit the FBG 710. The FBG 710 then reflects a first portion of the optical signals generated by the optical source 740, corresponding to the selected FSR B2, which has no overlap with the optical spectrum B1. The FBG 710 allows a second portion to pass through the FBG 710, and subsequently through the optical circulator 720 where the second portion is either terminated at a hidden forth port of the optical circulator or routed to output from port 10 of the optical circulator 720. The selected FSR B2 is reflected by the FBG 710 back into the second port 20 of the optical circulator 725. Subsequently, the FSR B2 is output from the optical circulator 725 via the third port 30.

An optical signal produced by the spontaneous emission source 745 is modulated by the modulator 747 to incorporate the data for a third service (Service 3) and enters the optical circulator 730 through a first port 10. Once coming into the optical circulator 730 through port 10, the optical signals are then outputted from the optical circulator 730 through the second port 20. The FBG 715 then reflects a first portion of the optical signals generated by the optical source 745, corresponding to the selected FSR BN, and allows a second portion to pass through the FBG 715, and subsequently through the optical circulators 725. The second portion is terminated to a hidden forth port of the optical circulator 725 or routed to output from port 10 of the optical circulator 725. The use of the term "N" is meant to indicate that the number of grating-circulator filters within a transmitter/receiver unit may be any number that corresponds with the number of broadcast services provided and consumed in a network. The selected FSR BN is reflected by the FBG 715 back into the second port 20 the optical circulator 730. Subsequently, the FSR BN is output from the optical circulator 730 via the third port 30. It should be recognized that the optical spectra B1, B2, . . . , BN are non-overlapping with each other. It should also be noted that all the FBGs only reflect their respective designed optical spectrum, B1, B2 etc. They are transparent to all the signals in the optical spectrum other than their designed reflection band B1, B2, etc.

The third port 30 of the optical circulator 720 is coupled to the FBG 710. Since the FBG 710 does not reflect the optical spectrum B1, the output of the third port 30 of the optical circulator 720, which covers B1, passes through the FBG 710 and is input to the second port 20 of the optical circulator 725. Thus the output from the third port 30 of the optical circulator 720 also passes through the optical circulator 725 and emerges from its third port 30 without degradation. The output optical signal from the third port 30 of the optical circulator 725, which covers both B1 and B2, is coupled to the FBG 715. Since the FBG 715 does not reflect the optical spectrum B1 and B2, the output of the third port 30 of the optical circulator 725 passes through the FBG 715 and are input to the second port of the optical circulator 730. Thus the outputs B1 and B2 from the third port 30 of the optical circulator 725 also pass through the optical circulator 730 and emerge from its third port 30 without degradation. Therefore, the output from the third port 30 of the optical circulator 730 contains the optical spectra B1, B2, . . . , BN and is shown as the output signal 750 of the transmitter 700 in FIG. 7. It should be noted that adding another service over a different optical spectrum is as simple as attaching another grating-circulator stage in front of the FBG 705. Therefore, the system can grow in a modular way.

Figure 8:
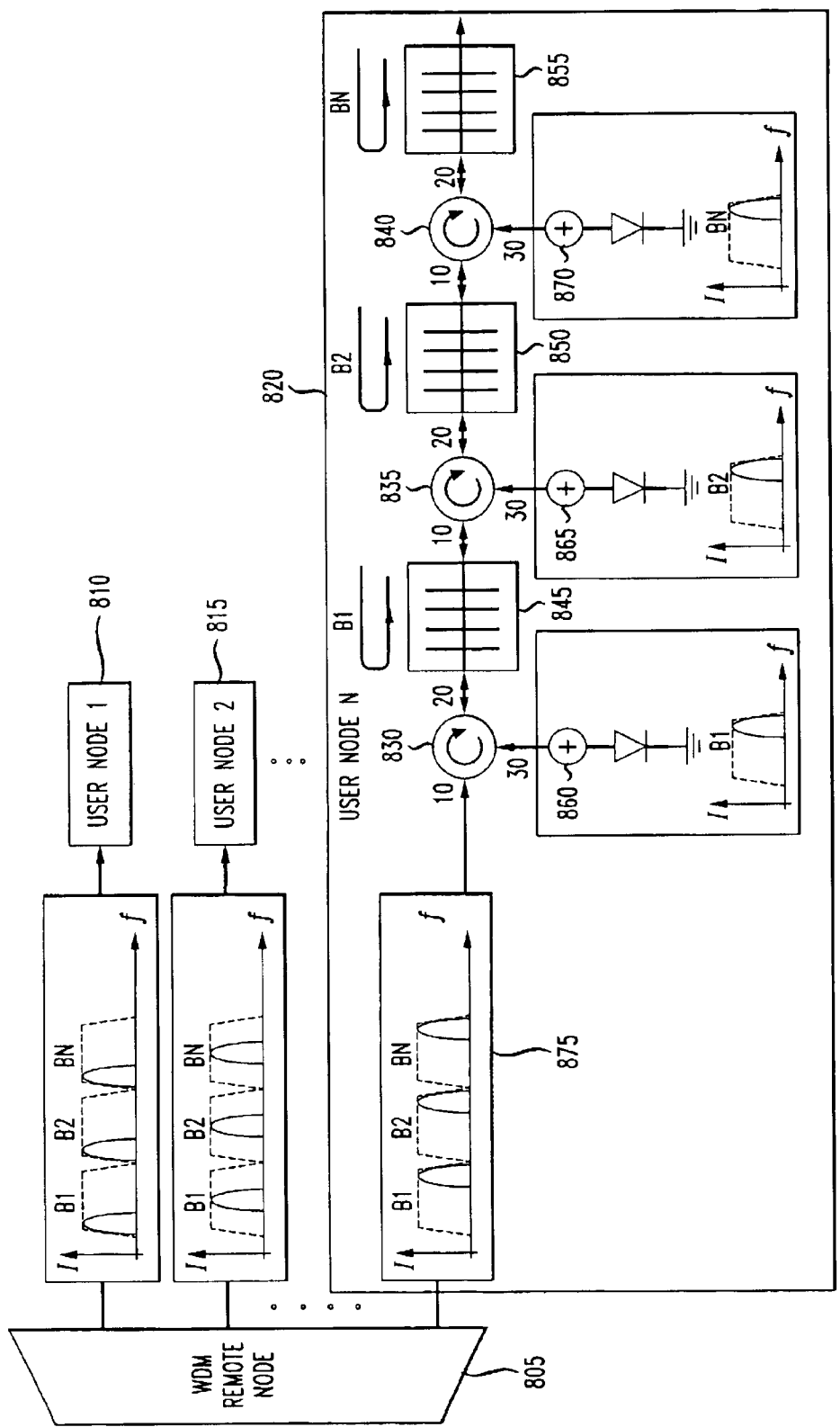
FIG. 8 illustrates a diagram of a portion of a multiple broadcast data transmission system utilizing cascaded FBG-circulator arrangements as part of a user node to separate individual broadcast services, used in accordance with the first exemplary embodiment of the invention.

The grating-circulator arrangement can also be used to separate the different broadcast bands at a receiver. FIG. 8 illustrates a diagram of a portion of a multiple broadcast data transmission system at a user node, utilizing cascaded grating-circulator arrangements to separate the received multi-band broadcast services into individual services, used in accordance with the first exemplary embodiment of the invention. As shown in FIG. 8, user nodes 810, 815, 820 each include receiver sections for receiving data via the WDM PON remote node 805. Although each of the user nodes 810, 815, 820 includes receiver sections, only 820 shows the receiver section in detail. As shown in FIG. 8, the receiver section includes FBGs 845, 850, 855, optical circulators 830, 835, 840 and photodetectors 860, 865, 870.

FBG 845 and optical circulator 830 act as a first optical filter for the photodetector 860. FBG 850 and optical circulator 835 act as a first optical filter for the photodetector 865. FBG 855 and optical circulator 840 act as a first optical filter for the photodetector 870.

An optical signal 875 received by the receiver unit 820 via the WDM PON enters the optical circulator 830 through a first port 10. Once in the optical circulator 830, the optical signal is then outputted from the optical circulator 830 through the second port 20 and travels down to the grating 845. The FBG 845 then reflects a first portion of the optical signals, corresponding to the selected FSR B1, and allows the rest of the spectrum to pass through the FBG 845. The selected portion of the optical signal corresponding to FSR B1 is reflected by the FBG 845 back into the optical circulator 830 via the second port 20. Subsequently, the FSR B1 is output from the optical circulator 830 via the third port 30. The data incorporated within the selected portion FSR B1 of the optical signal is then detected by the photodetector 860 for use by an end user.

The pass-through optical signal after the FBG 845 contains signals in the optical spectra of B2 and BN. This signal enters the optical circulator 835 through a first port 10. Once in the optical circulator 835, the optical signals are then outputted from the optical circulator 835 through the second port 20. The FBG 850 then reflects a first portion of the optical signals, corresponding to the selected FSR B2, and allows the rest of the spectrum to pass through the FBG 850, and subsequently through the optical circulator 840. The selected FSR B2 is reflected by the FBG 850 back into the optical circulator 835 via the second port 20. Subsequently, the FSR B2 is output from the optical circulator 835 via the third port 30. The data incorporated within the selected portion FSR B2 of the optical signal is then detected by the photodetector 865 for use by an end user.

The pass-through optical signal after the FBG 850 contains signals in the optical spectrum BN. This optical signal enters the optical circulator 840 through a first port 10. Once in the optical circulator 840, the optical signals are then outputted from the optical circulator 840 through the second port 20. The FBG 855 then reflects a first portion of the optical signals, corresponding to the selected FSR BN, and allows the rest of the spectrum to pass through the FBG 855. The use of the term "N" is meant to indicate that the number of grating-circulator filters within a receiver unit may be any number that corresponds with the number of broadcast services consumed by that user node. The selected FSR BN is reflected by the FBG 855 back into the optical circulator 840 via the second port 20. Subsequently, the FSR BN is output from the optical circulator 840 via the third port 30. The data incorporated within the selected portion FSR BN of the optical signal is then detected by the photodetector 870 for use by an end user.

All non-selected portions of the signal received by the receiver unit 820 pass through optical circulators and FBGs without being included as part of the optical signal to be detected. It should be recognized to add another service to be received at a different optical spectral range, it is as simple as adding another stage of the grating-circulator arrangement after the FBG BN. Therefore, the system can grow easily in a modular way. It also should be noted that a user only needs to deploy the FBG's corresponding to the services that he subscribes. This enables one to achieve the pay-as-you-grow network upgrade.

Figure 9:
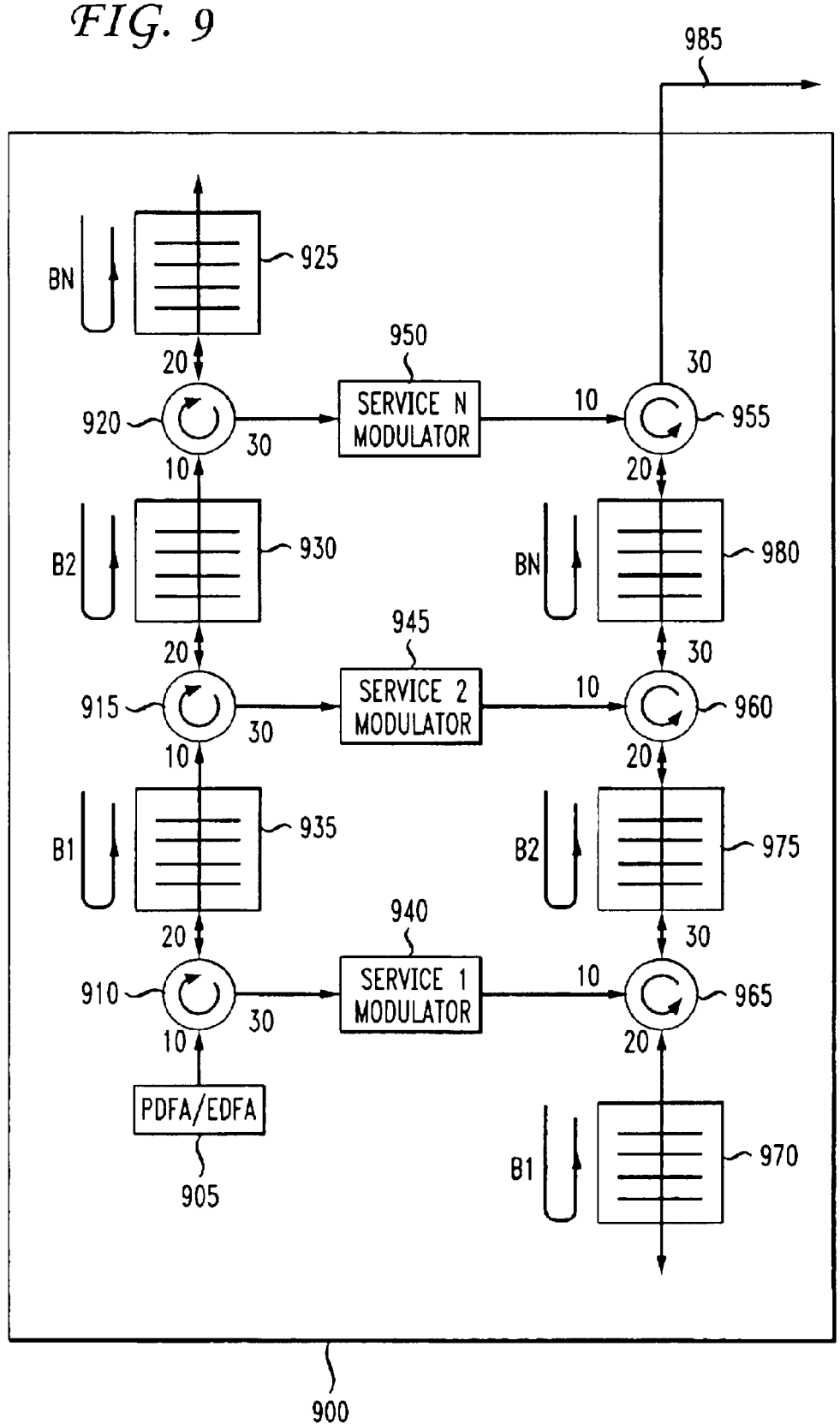
FIG. 9 illustrates a diagram of a portion of a multiple broadcast data transmission system utilizing cascaded grating-circulator arrangements for sharing one broadband optical source across different services, as part of a hub node or central office used in accordance with a second exemplary embodiment of the invention.

FIG. 9 illustrates a diagram of a portion of a multiple broadcast data transmission system utilizing cascaded grating-circulator arrangements as part of a transmitter used in accordance with a second exemplary embodiment of the invention. A single high power broadband spontaneous emission source is used to provide multiple broadcast services in FIG. 9, allowing cost sharing of the optical source among different services. As shown in FIG. 9, a transmitter section 900 includes a spontaneous emission source 905, FBGs 925, 930, 935, 970, 975, 980, optical circulators 910, 915, 920, 955, 960, 965 and modulators 940, 945, 950.

FBG 935 and optical circulator 910 act as a first optical filter for the spontaneous emission source 905 to select a portion FSR B1. An optical signal generated by the spontaneous emission source 905 is input into the first port 10 of the optical circulator 910. Once in the optical circulator 910, the optical signal is output via the second port 20 and is input to the FBG 935. The FBG 935 then reflects the selected portion of the optical signal within the FSR B1 and passes the remaining portion of the optical signal through the FBG 935.

The selected portion of the optical signal FSR B1 is reflected back into the second port 20 of the optical circulator 910. Subsequently, the selected portion of the optical signal FSR B1 is then output from the third port 30 of the optical circulator 910 and input to modulator 940 for Service 1. The selected portion of the optical signal FSR B1 is modulated by the modulator 940 to incorporate data for the first service (Service 1) to be delivered to network user nodes (see FIG. 8).

FBG 930 and optical circulator 915 act as a second optical filter for the spontaneous emission source 905 to select a portion FSR B2. The remaining portion of the broadband optical signal passing through FBG 935 is input into the first port 10 of the optical circulator 915. Once in the optical circulator 915, the optical signal is output via the second port 20 and is input to the FBG 930. The FBG 930 then reflects the selected portion of the optical signal within the FSR B2 and passes the remaining portion of the optical signal through the FBG 930.

The selected portion of the optical signal FSR B2 is reflected back into the second port 20 of the optical circulator 915. Subsequently, the selected portion of the optical signal FSR B2 is then output from the third port 30 of the optical circulator 915 and input to modulator 945 for Service 2. The selected portion of the optical signal FSR B2 is modulated by the modulator 945 to incorporate data for the second service (Service 2) to be delivered to network user nodes (see FIG. 8).

FBG 925 and optical circulator 920 act as a third optical filter for the spontaneous emission source 905 to select a portion FSR BN. The remaining portion of the broadband optical signal passing through FBG 930 is input into the first port 10 of the optical circulator 920. Once in the optical circulator 920, the optical signal is output via the second port 20 and is input to the FBG 925. The FBG 925 then reflects the selected portion of the optical signal within the FSR BN and passes the remaining portion of the optical signal through the FBG 925.

The selected portion of the optical signal FSR BN is reflected back into the second port 20 of the optical circulator 920. Subsequently, the selected portion of the optical signal FSR BN is then output from the third port 30 of the optical circulator 920 and input to modulator 950 for Service N. The selected portion of the optical signal FSR BN is modulated by the modulator 950 to incorporate data for the Nth service (Service N) to be delivered to network user nodes (see FIG. 8).

The outputs of modulators 940, 945, 950, contain modulated data corresponding to Services 1, 2, N, respectively. However, the outputs must be recombined into an optical signal that can be transmitted over a WDM PON network to deliver the various services to the user nodes. Therefore, optical circulators 955, 960, 965 and FBGs 970, 975, 980 are coupled to the modulators and each other in such a way that the output signals from the modulators 940–950 are recombined.

Figure 10:
FIG. 10 illustrates the spectrum of the optical signal emanating from a first FBG-circulator arrangement illustrated in FIG. 9.

The output signal from modulator 940, which covers the optical spectrum B1, is input to the optical circulator 965 via the first port 10. Once in the optical circulator 965, the optical signals are then outputted from the optical circulator 965 through the second port 20. The FBG 970 then reflects the selected FSR B1 back to the second port 20 of the optical circulator 965. Subsequently, the FSR B1 is output from the third port 30 of optical circulator 965, which will travel down the next FBG 975. FIG. 10 illustrates the optical signal emanating from the third port 30 of the optical circulator 965.

Figure 11:
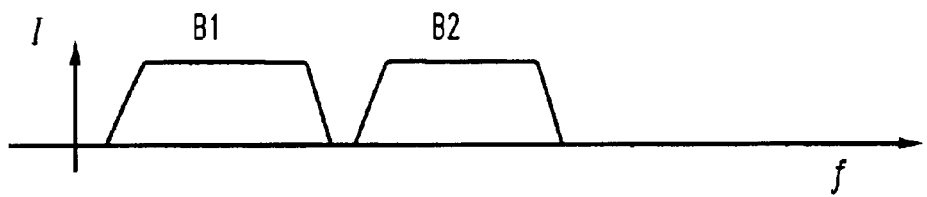
FIG. 11 illustrates the spectrum of the optical signals emanating from a second FBG-circulator arrangement illustrated in FIG. 9.

The output signal from modulator 945, which covers the optical spectrum B2, is input to the optical circulator 960 via the first port 10. Once in the optical circulator 960, the optical signals are then outputted from the optical circulator 960 through the second port 20. The FBG 975 then reflects the optical signals corresponding to the selected FSR B2 back to the second port 20 of the optical circulator 960. Subsequently, the FSR B2 is output from the optical circulator 960 via the third port 30. FSR B1 also travels through the FBG 975 and optical circulator 960. FIG. 11 illustrates the optical signals emanating from the third port 30 of the optical circulator 960, which will travel down the FBG 980.

Figure 12:
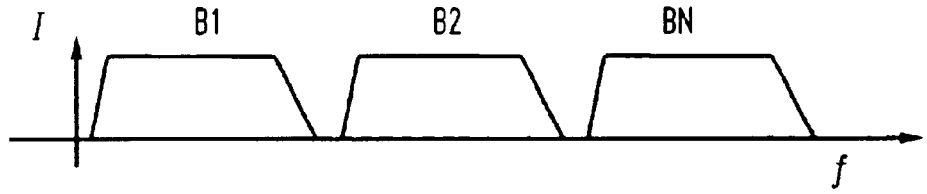
FIG. 12 illustrates the spectrum of the final output optical signals emanating the arrangement illustrated in FIG. 9.

The output signal from modulator 950 which covers the optical spectrum BN, is input to the optical circulator 955 via the first port 10. Once in the optical circulator 955, the optical signals are then outputted from the optical circulator 955 through the second port 20. The FBG 980 then reflects the optical signals corresponding to the selected FSR BN. The use of the term "N" is meant to indicate that the number of grating-circulator filters within a transmitter unit may be any number that corresponds with the number of broadcast services provided in a network. The selected FSR BN is reflected by the FBG 980 back into the optical circulator 955 via the second port 20. Subsequently, the FSR BN is output from the optical circulator 955 via the third port 30. FSR B1 and B2 also travel through the FBG 980 and optical circulator 955. FIG. 12 illustrates the optical signals 985 emanating from that optical circulator 955.

Accordingly, an output signal 985 of the transmitter 900 includes optical data incorporated in the frequency spectrum corresponding to B1, B2 and BN. This provides an optical signal that is identical to output signal 750 provided by the transmitter architecture according to the first exemplary embodiment of the invention illustrated in FIG. 7.

All non-selected portions of the signals generated by the spontaneous emission source 905 pass through optical circulators and FBGs without being included as part of the optical signal to be transmitted. To add another service, one just add one set of the grating-circulator arrangement in another band next to the FBG 925 and another corresponding pair next to the FBG 970. It should also be noticed that in FIG. 9 the sequence of the gratings are arranged in a way that the signal in every band B1, B2 and BN goes through the same number of optical circulators (in this case 4) before it is output from the last optical circulator 955. This has the advantage that similar insertion loss is introduced into signals in different bands and the final output signal 985 is relatively balanced across the optical bands.

Figure 13:
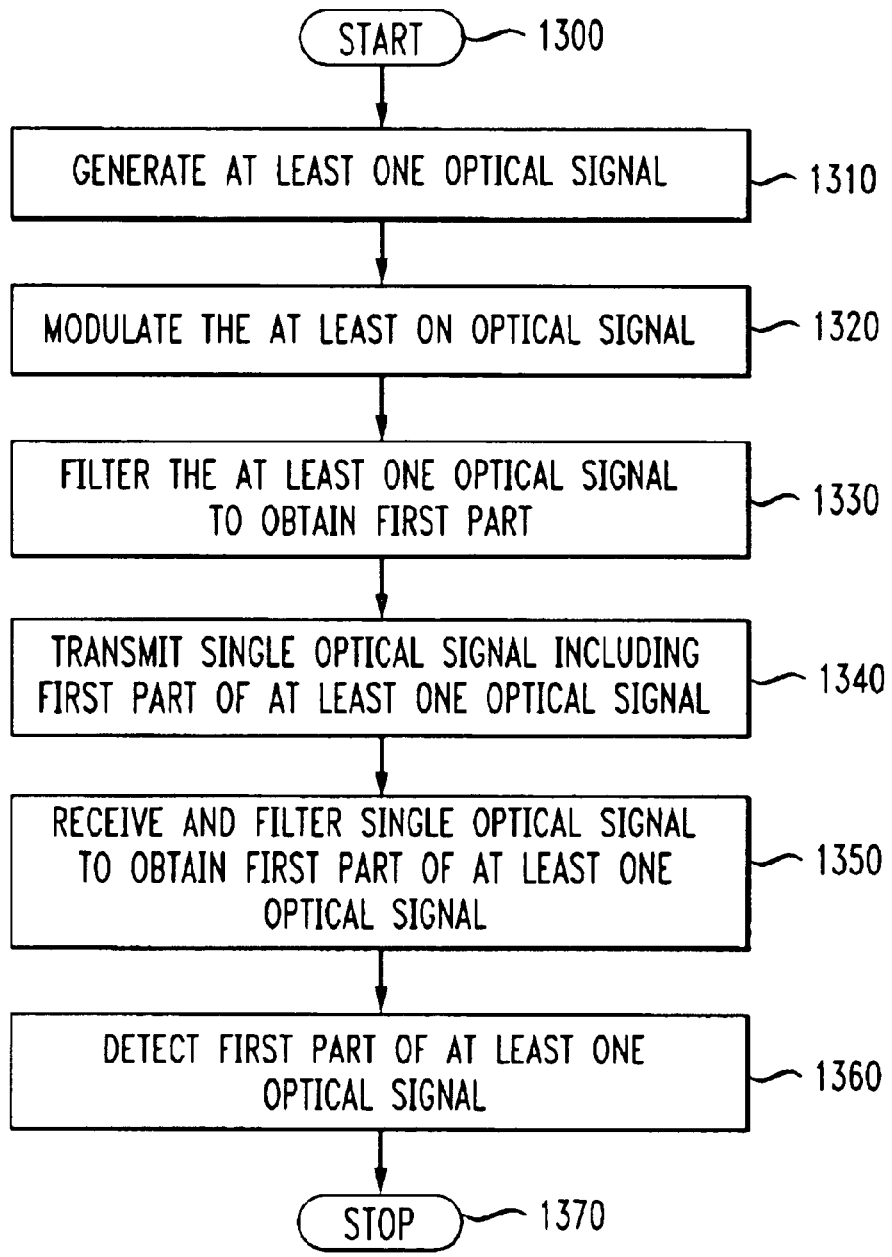
FIG. 13 is a flowchart illustrating steps for delivering multiple-band broadcast services in accordance with the first exemplary embodiment of the invention.

FIG. 13 is a flowchart illustrating steps for delivering multiple-band broadcast services in accordance with the first exemplary embodiment of the invention. As shown in FIG. 13, the method begins in step 1300 and proceeds to step 1310. In step 1310, at least one optical signal is generated by at least one optical signal source. Control then proceeds to step 1320 in which the at least one optical signal is modulated to incorporate data for transmission. Control then proceeds to step 1330, in which the at least one modulated optical signal is filtered to divide the at least one modulated optical signal into a first and a second-part, based on various frequency spectra of the optical signal. Control then proceeds to step 1340, in which the multiple first-parts of optical signals are combined to form a single optical signal. Control then proceeds to step 1350, in which the first-part of the least one modulated optical signal is transmitted over a network to at least one receiver as part of a single optical signal that may contain other parts of modulated optical signals. Control then proceeds to step 1360, in which the single optical signal is filtered to separate the single optical signal into a plurality of parts including the first-part of the at least one modulated optical signal based on various frequency spectra of the optical signal. Control then proceeds to step 1370, in which the first-part of the at least one modulated optical signal is detected by a photodetector. Control then proceeds to step 1380, in which the method ends.

Although the operation of the first exemplary embodiment explained in FIG. 13 has been explained in conjunction with only one optical signal source, it should be appreciated that the first exemplary embodiment may and is preferably performed in conjunction with a plurality of optical signal sources providing a plurality of optical signals. Each of these optical signals would be filtered, modulated, transmitted, received and demodulated in accordance with the flowchart illustrated in FIG. 13 to allow for delivery of multiple-band broadcast services. This is a significant difference from the second exemplary embodiment of the invention, which allows for delivery of multiple-band broadcast services while sharing a single optical signal source to provide a carrier signal section for each of the multiple-band broadcast services, as explained in conjunction with FIG. 14.

Figure 14:
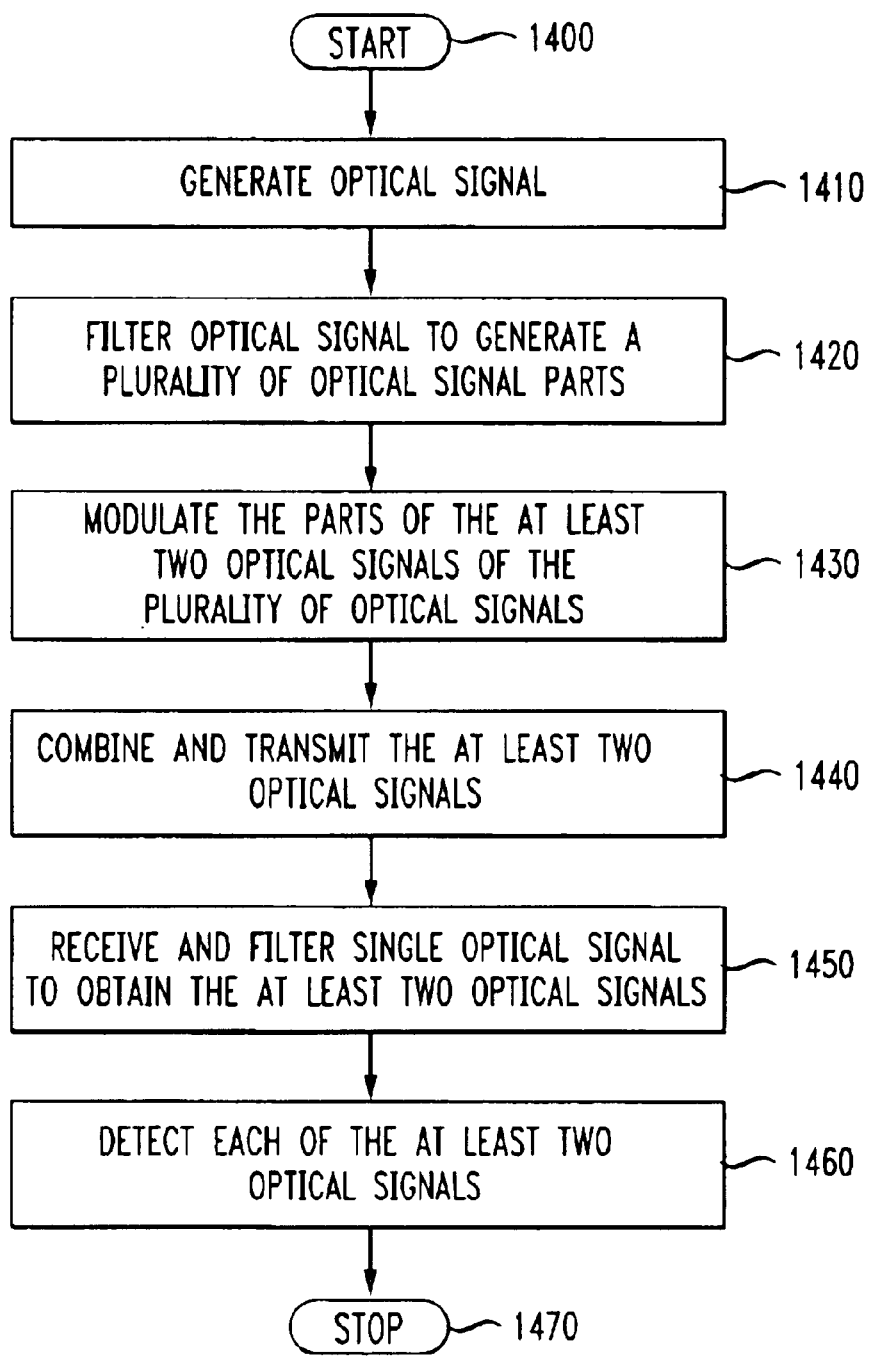
FIG. 14 is a flowchart illustrating steps for delivering multiple-band broadcast services in accordance with the second exemplary embodiment of the invention.

FIG. 14 is a flowchart illustrating steps for delivering multiple-band broadcast services in accordance with the second exemplary embodiment of the invention. As shown in FIG. 14, the method begins in step 1400 and proceeds to step 1410. In step 1410, an optical signal is generated. Control then proceeds to step 1420, in which the optical signal is filtered to divide the optical signal into a plurality of optical signal parts each having different free spectral ranges. Control then proceeds to step 1430, in which at least two of the plurality of optical signals are each modulated to incorporate data for transmission. Control then proceeds to step 1440, in which the at least two modulated optical signals are combined into a single optical signal that is transmitted over a network to at least one receiver. Control then proceeds to step 1450, in which the single optical signal is received and filtered to separate the at least two modulated optical signals, based on various frequency spectra of the single optical signal. Control then proceeds to step 1460, in which each of the separated optical signals is detected by a photodetector. Control then proceeds to step 1470, in which the method ends.

Figure 15:
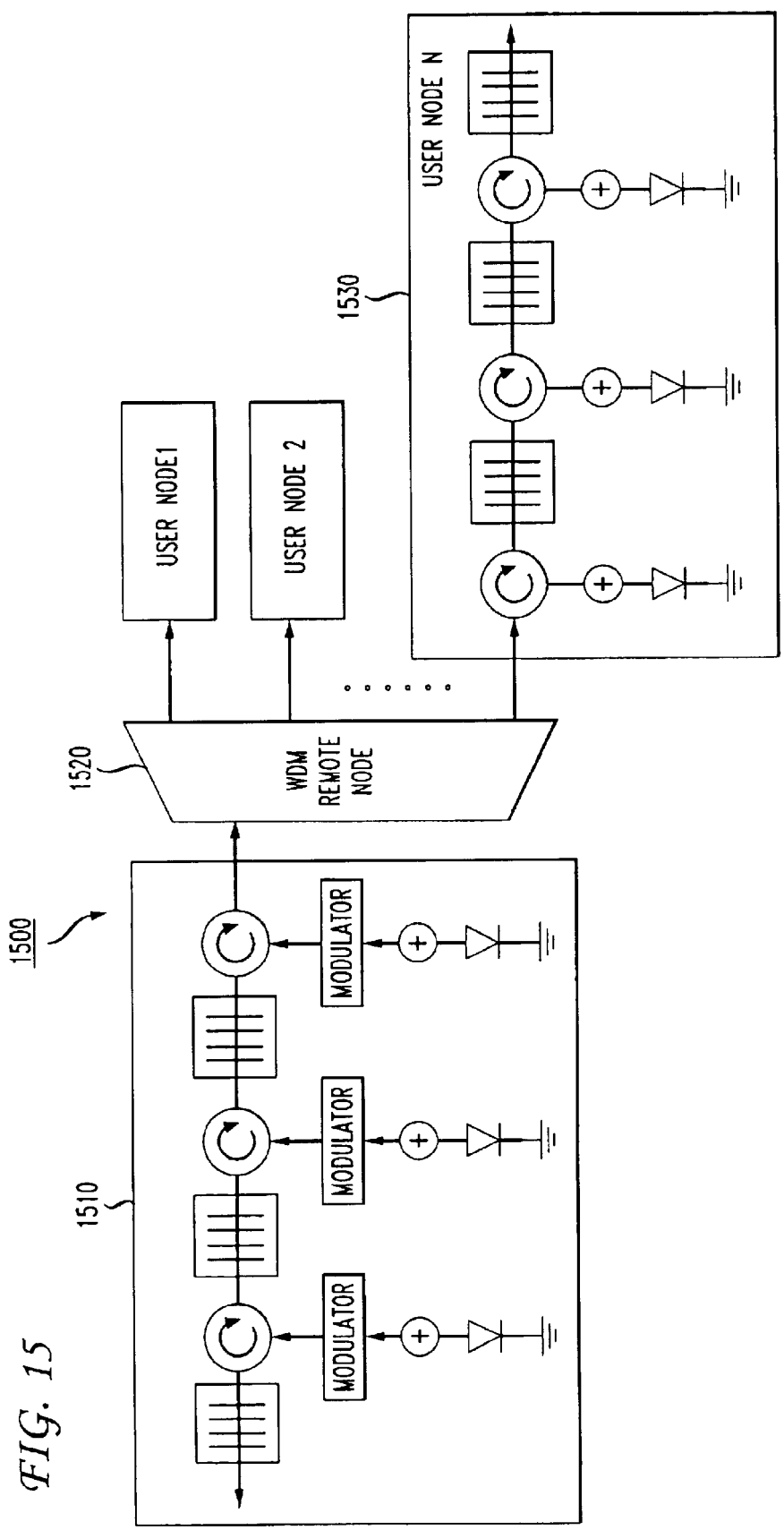
FIG. 15 illustrates one exemplary embodiment of a transmission system utilizing cascaded grating-circulator filters for delivering multiple-broadcast band services.

FIG. 15 illustrates a diagram of a WDM PON system 1500 supporting multiple broadcast data transmission utilizing cascaded grating-circulator arrangements as part of both the transmitter 1510 in the central office and the receiver 1530 used in accordance with a first exemplary embodiment of the invention. The transmitter 1510 communicates with the receiver 1530 via the WDM passive optical remote node 1520. It should be appreciated that the transmitter 1510 and/or the receiver 1530 may include cascaded grating-circulator arrangements. Alternatively, a receiver or transmitter using the cascaded grating-circulator arrangements may be used in conjunction with a transmitter or receiver, respectively, that do not use the cascaded grating-circulator arrangements. Therefore, the cascaded grating circulator arrangements may be used to transmit and/or receive WDM data signals.

It should be realized that to achieve the broadband reflector used in the embodiments of the invention, which covers at least one FSR of a wavelength router. The fiber Bragg grating has to be chirped. Chirping introduces delays into different parts of the transmitted signals and causes dispersion, which broadens the transmitted signal pulses. If one connects the broadened signal pulses to another similar grating-circulator arrangement but with the orientation of the chirped FBG reversed with respect to the circulator, then the delays introduced to the various parts of the signal is reversed and the signal pulses are compressed. Therefore, the pair of gratings used to reflect the same first-part of the optical signals in the transmitter and the receiver should be connected in opposite orientations with respect to the circulator to avoid building up dispersion in the signal pulses. As a matter of fact, the transmission optical fiber cables between the transmitter and receivers also introduce dispersions into the optical signal, which increases with the transmission distance. The FBG pairs can be designed with different chirpings so that the dispersion at the receiver grating compensates for both the transmission fiber dispersion and the dispersion caused by the chirping in the transmitter FBG. For example, when the dispersion caused by the FBG in the receiver is approximately equal to the opposite of the transmission fiber dispersion and the dispersion provided by the transmitter, e.g., so that the receiver sensitivity penalty is less than 1 dB, transmission performance is improved. This will increase the transmission distance between the transmitters and receivers.

The present invention may be implemented in conjunction with a WDM passive optical network such as that disclosed in P. P. Iannone et al., "High-Speed Point-to-Point and Multiple Broadcast Services Delivered over a WDM Passive Optical Network", IEEE Photonics Technology Letters, Vol. 10, No. 9, September 1998.

Exemplary embodiments of the invention provide an optically broadband WDM multiplexing/de-multiplexing using FBGs for use in a multi-band broadcast service system. Although chirped FBGs have been used for dispersion compensation of long haul fiber links, they have not been used to perform WDM functions that combine and/or separate spectrally sliced WDM broadcast services. In most applications, unchirped FBGs are used as channel filters because they are spectrally wider than the laser line and simplistically provide a low-loss connection to a trunk and rejection of other laser lines in neighboring channels. However, to the contrary, the exemplary embodiments of the invention use chirped FBGs as ubiquitous elements at user sites.

Even for short haul applications, chirped FBGs can be used for dispersion compensation, which is a known technique, because of the high RF frequency and large spectral content. However, the present invention combines both dispersion compensation, i.e., pre-compensation at a headendor post-compensation at the receiver, and wavelength band add/drop functions on the same architecture.

Moreover, the system architecture prescribed by the present invention is such that it permits extension of the multiple-band broadcast services in a modular fashion. This system architecture approach is fundamentally different than other WDM architectures. The extensibility of system architectures designed according to the present invention renders them uniquely suited to upgrade strategies in which the full scope and character of a wavelength plan is not known at the time of network deployment. It allows for the pay-as-you-grow upgrade strategy.

The invention is also useful in a coarse or intermediate wavelength division multiplexing system (without spectral slicing) in which a relaxed wavelength tolerance is required for the source, e.g., using uncooled lasers whose wavelengths are not temperature stabilized. As described previously, another situation where the broadband chirped FBG/circulator wavelength add/drop technique allows for more tolerance to temperature because it may be implemented in conjunction with spontaneous emission sources, e.g., light emitting diodes, that are not as subject to temperature variation as conventional lasers.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, the invention may also be advantageously implemented in conjunction with a hybrid fiber coaxial (HFC) system architecture. For example, the invention may be implemented in conjunction with the broadband access network system architecture disclosed in U.S. Pat. No. 5,742,414, issued on Mar. 2, 1998, to Frigo et al., and assigned to AT&T. Such an incorporation is also useful in an HFC distribution plant incorporating miniFiber Node (X. Lu, T. E. Darcie, G. E. Bodeep, S. L. Woodward and A. H. Gnauck, "Mini-fiber-node hybrid fiber coax networks for two-way broadband access", OFC '96 Optical Fiber Communication, Vol. 2 1996 Technical Digest Series, Conference Edition, pp. 143–44; X. Lu, T. E. Darci, A. Gnauck, S. Woodward, B. Desai and X. Qiu, "Crafting a Low-Cost Two-Way Upgrade: Future-Proofing via Aggressive Fiber Deployment", Communication Engineering & Design, March 1998, pp. 52–61.) and Lightwire/mFN network (O. Sniezko, T. Werner, D. Combs, E. Sandino, X. Lu, T. Darcie, A. Gnauck, and R. Mclaughlin, "HFC Architecture in the Making: Future-Proofing the Network", Communication Engineering & Design, July 1999.) technologies.

Moreover, it is foreseeable that although the figures illustrate only a finite number of user nodes, it should be appreciated that any number of user nodes less than the number of the WDM remote node output ports may be operationally coupled to the WDM remote node.

It should be recognized that the exemplary embodiments of the invention may be implemented not only as an improved method and system for delivering multi-band broadcast services in a WDM PON but also may be designed as a mechanism for compensating for transmission fiber cable dispersion in that WDM PON.

Transmitted data signals usually cover a frequency range and a certain range of wavelengths in an optical fiber. However, different wavelengths travel with different velocities in the optical fiber cable. Therefore, the time that signals at these different wavelengths arrive at a receiver is different. Such is a cause of distortions in a transmitted signal in an optical network. The longer the fiber cable in an optical network, the more dispersion is introduced in the transmitted signal and more compensation is required. As a result, there is a maximum distance that signals can be transmitted without dispersion compensation.

Figure 16:
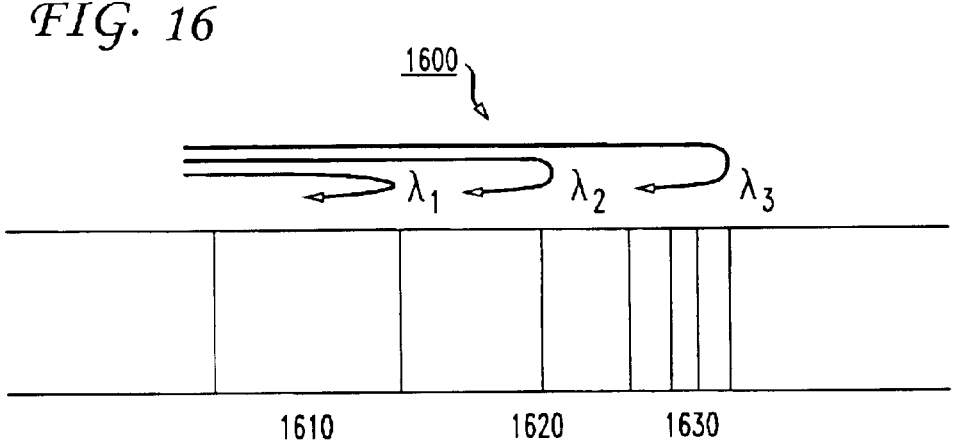
FIG. 16 illustrates a diagram of a chirped Bragg grating for dispersion compensation.

By using chirped FBG's to perform multi-band broadcast service delivery, dispersion compensation can also be effectively performed. As shown in FIG. 16, an FBG 1600 is comprised of a periodic series of partial optical reflectors 1610, 1620, 1630 etc. The wavelength that an FBG reflects depends on the periodicity of those reflectors.

Usually, FBG's are narrow band devices; therefore, they only reflect wavelengths in a small frequency range around the wavelength they are designed for. However, to achieve broader responses, it is well known to use a chirped FBG with a periodicity that gradually changes when the grating is manufactured. As shown in FIG. 16, different wavelengths ($\lambda_1$, $\lambda_2$, $\lambda_3$, etc.) are reflected by different sections of the gratings. More specifically, for example, $\lambda_1$ is reflected by an effective reflector at position 1610, $\lambda_2$ is reflected by an effective reflector at position 1620 and $\lambda_3$ is reflected by an effective reflector at position 1630. Therefore, the portions of the signals at those wavelengths, i.e., $\lambda_1$, $\lambda_2$, $\lambda_3$, etc., travel different distances resulting in different time delays for the signals to travel in the FBG 1600.

In accordance with the exemplary embodiments of the invention, a chirped FBG can be used to compensate for the varying fiber delays if the chirping is properly designed to counteract the delays due to optical fiber. Specifically, the chirped FBG can be designed so that earlier arrived wavelength signals travel longer distance in the chirped FBG. For more explanation on such a use of chirped FBGs see Garrett, L. D., Gnauck, A. H., Forghieri, F., Gusmeroli, V. and Scarano, D.,"16/spl times/10 Gb/s WDM transmission over 840-km SMF using eleven broad-band chirped fiber gratings", *IEEE Photonics Technology Letters*, Volume: 11 4, April, 1999, pp. 484–486, hereby incorporated by reference in its entirety.

Because, according to the exemplary embodiments, chirped FBG's are utilized at the transmitter, dispersion, i.e., wavelength dependent delay, can be artificially introduced in the transmitted signal. However, the same chirped FBG's are used at the receiver but reversed. Therefore, all the artificial relative delays introduced by using chirped FBG's at the transmitter will be compensated at the receiver. Thus, if the chirped FBG's at the transmitter and receiver are inverses of each other, the only dispersion left in the signal is the dispersion introduced by the transmission fiber. However, one can make the grating used at the transmitter and the receiver chirped differently so that the receiver grating will compensate for both the fiber dispersion and the transmitter grating dispersion. As a result, the FBGs utilized in the exemplary embodiments of the invention may be designed in such a way so as to extend signal transmission distance within a PON. It should be realized that such dispersion compensation can be implemented either at the transmitter side or the receiver side.

While the present invention has been described with reference to specific illustrative embodiments, it is not confined to the specific details set forth, but is intended to cover such modifications or changes as may come within the scope of this invention.

What is claimed is:

1. A multiple-band broadcast service delivery method comprising:

generating an optical carrier signal;

filtering the optical carrier signal to provide a plurality of first-parts based on frequency spectra of the optical carrier signal;

modulating each first-part of the plurality of first-parts to incorporate data in each of the plurality of first-parts; and combining the plurality of modulated first-parts into an optical transmission signal, wherein the step of combining the plurality of modulated first-parts into an optical transmission signal comprises:

inputting a first modulated first-part into a first optical circulator via a first port of a first optical circulator;

outputting the first modulated first-part from a second port of the first optical circulator;

reflecting the first modulated first-part from a first reflector back into the second port of the first optical circulator;

outputting the first modulated first-part from a third port of the first optical circulator;

outputting the first modulated first-part from the third port of the first optical circulator past a second reflector, which is transparent to the first modulated first-part and into a second port of a second optical circulator; and outputting the first modulated first-part from a third port of the second optical circulator along with a second modulated first-part.

* * * * *